(12) United States Patent
Keyser et al.

(10) Patent No.: US 8,227,145 B2
(45) Date of Patent: Jul. 24, 2012

(54) INTERLOCKABLE BEAD SEAL

(75) Inventors: Mark W. Keyser, Bloomfield, NY (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1163 days.

(21) Appl. No.: 12/050,652

(22) Filed: Mar. 18, 2008

(65) Prior Publication Data
US 2009/0239128 A1 Sep. 24, 2009

(51) Int. Cl.
*H01M 8/10* (2006.01)
*H01M 8/02* (2006.01)

(52) U.S. Cl. .................. 429/518; 429/508; 429/510

(58) Field of Classification Search .................. 429/518
See application file for complete search history.

(56) References Cited

U.S. PATENT DOCUMENTS

| 6,261,710 B1 * | 7/2001 | Marianowski | 429/434 |
| 7,687,175 B2 * | 3/2010 | Abd Elhamid et al. | 429/422 |
| 2008/0075993 A1 * | 3/2008 | Druenert et al. | 429/26 |

FOREIGN PATENT DOCUMENTS

| JP | 2005-327670 | * 11/2005 |
| WO | WO2007/003751 A1 | 1/2007 |

* cited by examiner

*Primary Examiner* — John S Maples
(74) *Attorney, Agent, or Firm* — Fraser Clemens Martin & Miller LLC; J. Douglas Miller

(57) ABSTRACT

An interlockable bead seal for a bipolar plate is provided. The interlockable bead seal includes a first elongate bead formed on a first plate and a second elongate bead formed on a second plate. The first elongate bead has a sealing surface and the second elongate bead has a trough. An interlockable bipolar plate having the interlockable bead seals, and a fuel cell stack formed from a plurality of the interlockable bipolar plates, are also provided. A lateral slippage between components of the fuel cell stack is militated against by the interlockable bipolar plates.

20 Claims, 4 Drawing Sheets

INTERLOCKABLE BEAD SEAL

FIELD OF THE INVENTION

The present disclosure relates to a fuel cell assembly and more particularly to a plate such as a bipolar plate for a fuel cell assembly having an interlockable bead seal.

BACKGROUND OF THE INVENTION

A fuel cell has been proposed as a clean, efficient and environmentally responsible power source for various applications. In particular, individual fuel cells can be stacked together in series to form a fuel cell stack capable of supplying a quantity of electricity sufficient to power an electric vehicle. The fuel cell stack has been identified as a potential alternative for a traditional internal-combustion engine used in modern vehicles.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

One type of fuel cell is known as a proton exchange membrane (PEM) fuel cell. The PEM fuel cell typically includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode to form a membrane-electrolyte-assembly (MEA).

In a typical PEM-type fuel cell, the MEA is sandwiched between diffusion media or diffusion layers (DM) that are formed from a resilient, conductive, and gas permeable material such as carbon fabric or paper. In certain designs, the cathode and anode are also formed on the DM and sandwich the electrolyte membrane. The DM serve as current collectors for the anode and cathode as well as provide mechanical support for the MEA. The DM and MEA are pressed between a pair of electronically conductive bipolar plates which also serve as current collectors for collecting the current from the electrochemical fuel cell reaction.

The bipolar plate typically includes two thin, facing metal unipolar plates. One of the metal unipolar plates defines a flow path on one outer surface thereof for delivery of hydrogen reactant to the anode of the MEA. An outer surface of the other unipolar plate defines a flow path for the oxidant reactant for delivery to the cathode side of the MEA. When the unipolar plates are joined, the joined surfaces define a path for a coolant fluid to flow therethrough. The unipolar plates are typically produced from a formable metal that provides suitable strength, electrical conductivity, and corrosion resistance, such as 316L alloy stainless steel, for example.

The fuel cell stack is generally compressed to hold the various components thereof together in operation. To militate against undesirable leakage of reactants and other fluids from the fuel cell stack, a seal is often employed. The seal may be provided by a gasket, for example. The seal may also be disposed along a peripheral edge of the pairs of plates.

Known seals have been formed from an elastomeric material. The seals formed by the elastomeric materials have performed adequately for prototyping. However, the cost of the elastomeric materials makes the use thereof undesirable for full scale manufacturing. Another known seal results from a line-contact between adjacent metal bead seals formed on the plates. However, an undesirable "shingling" or offsetting of the bead seals during compression of the fuel cell stack may result. A lateral movement of the fuel cell stack components during an operation of the fuel cell stack may also result in an undesirable leakage of fluids therefrom.

There is a continuing need for a robust bead seal between the plates of the fuel cell stack that militates against a leakage of fluids from the fuel cell stack and that is cost-effective in manufacturing.

SUMMARY OF THE INVENTION

In concordance with the instant disclosure, a robust, interlockable bead seal for sealing between plates of a fuel cell stack, wherein the bead seal militates against a leakage of fluids from the fuel cell stack and is cost-effective in manufacturing, has surprisingly been discovered.

In a first embodiment, an interlockable bead seal for a bipolar plate includes a first elongate bead formed on a first plate and a second elongate bead formed on a second plate. The first elongate bead has a sealing surface and the second elongate bead has a trough.

In another embodiment, a bipolar plate with the interlockable bead seal includes a first plate having a first elongate bead with a sealing surface, and a second plate having a second elongate bead with a trough. The first plate and the second plate are bonded together. The first elongate bead is disposed substantially opposite the second elongate bead to form the interlockable bead seal.

In a further embodiment, a fuel cell stack includes a plurality of interlockable bipolar plates aligned in a stack. The plurality of bipolar plates includes a first bipolar plate and a second bipolar plate. The first bipolar plate has a first interlockable bead seal with a trough. The second bipolar plate has a second interlockable bead seal with a sealing surface. The sealing surface of the second interlockable bead seal is received in and interlocks with the trough of the first interlockable bead seal.

DRAWINGS

Figure 5:
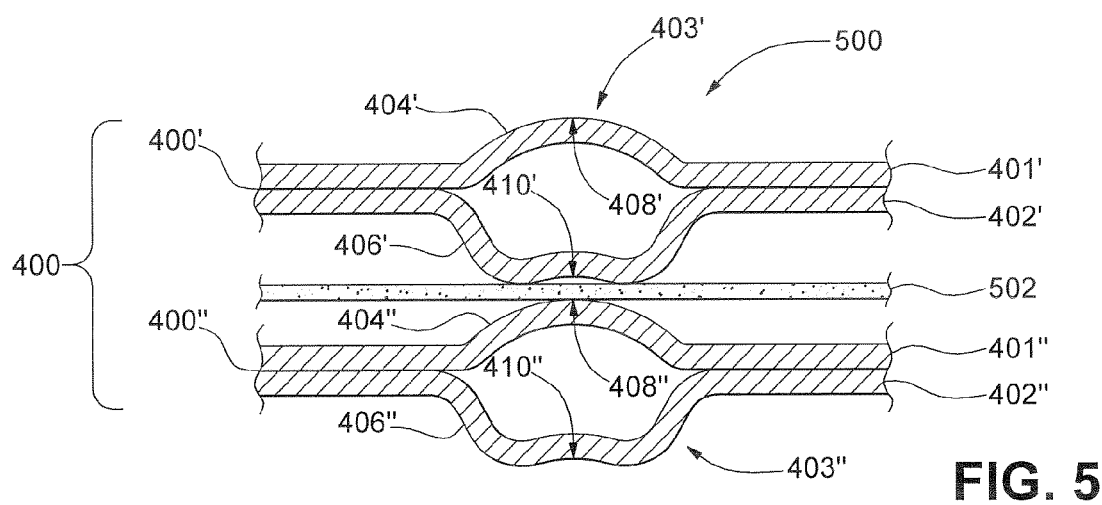
FIG. 5 is a side cross-sectional view of interlockable bead seals according to the present disclosure, the interlockable bead seals shown in a fuel cell stack in an uncompressed state.
Figure 6:
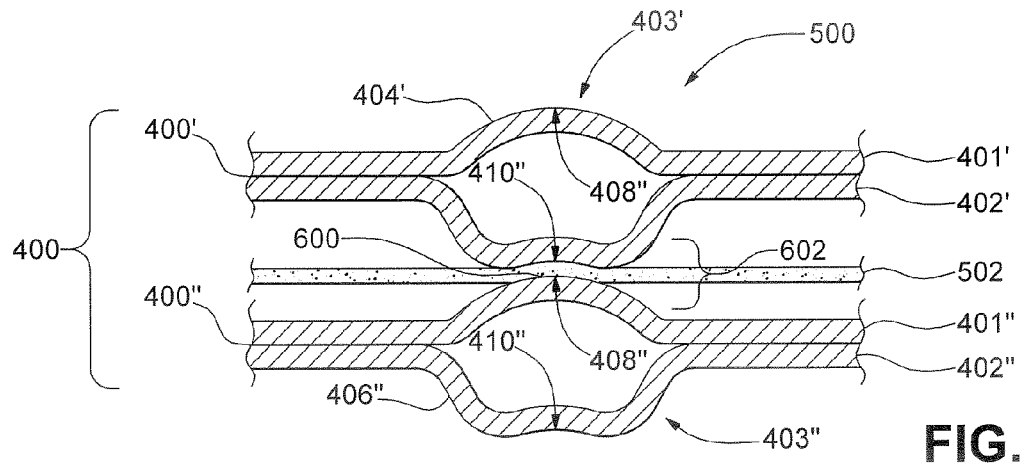
Figure 7:
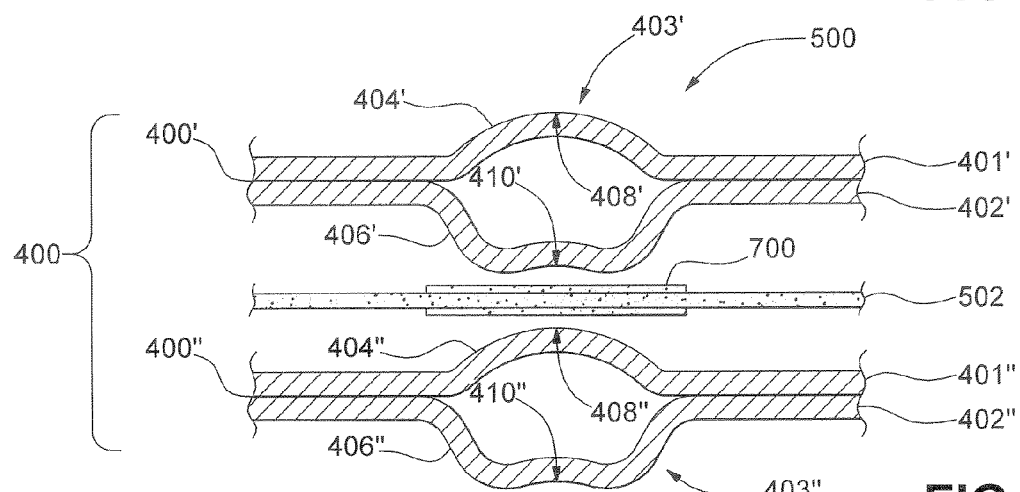
Figure 8:
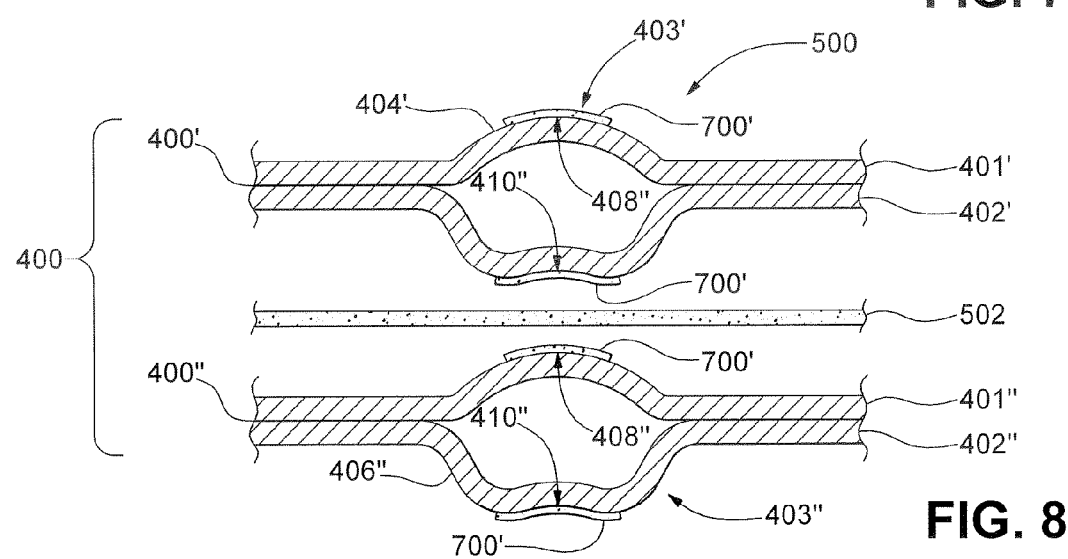

FIG. 6 is a side, cross-sectional view of the interlocking bead seals shown in FIG. 5, the interlocking bead seals shown in the fuel cell stack in a compressed state; and FIG. 7 is a side, cross-sectional view of interlockable bead seals according to the present disclosure, further including a subgasket with a micro-seal disposed thereon; and FIG. 8 is a side, cross-sectional view of interlockable bead seals according to the present disclosure, further including a micro-seal formed on a first surface and a second surface of the interlockable bead seal.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
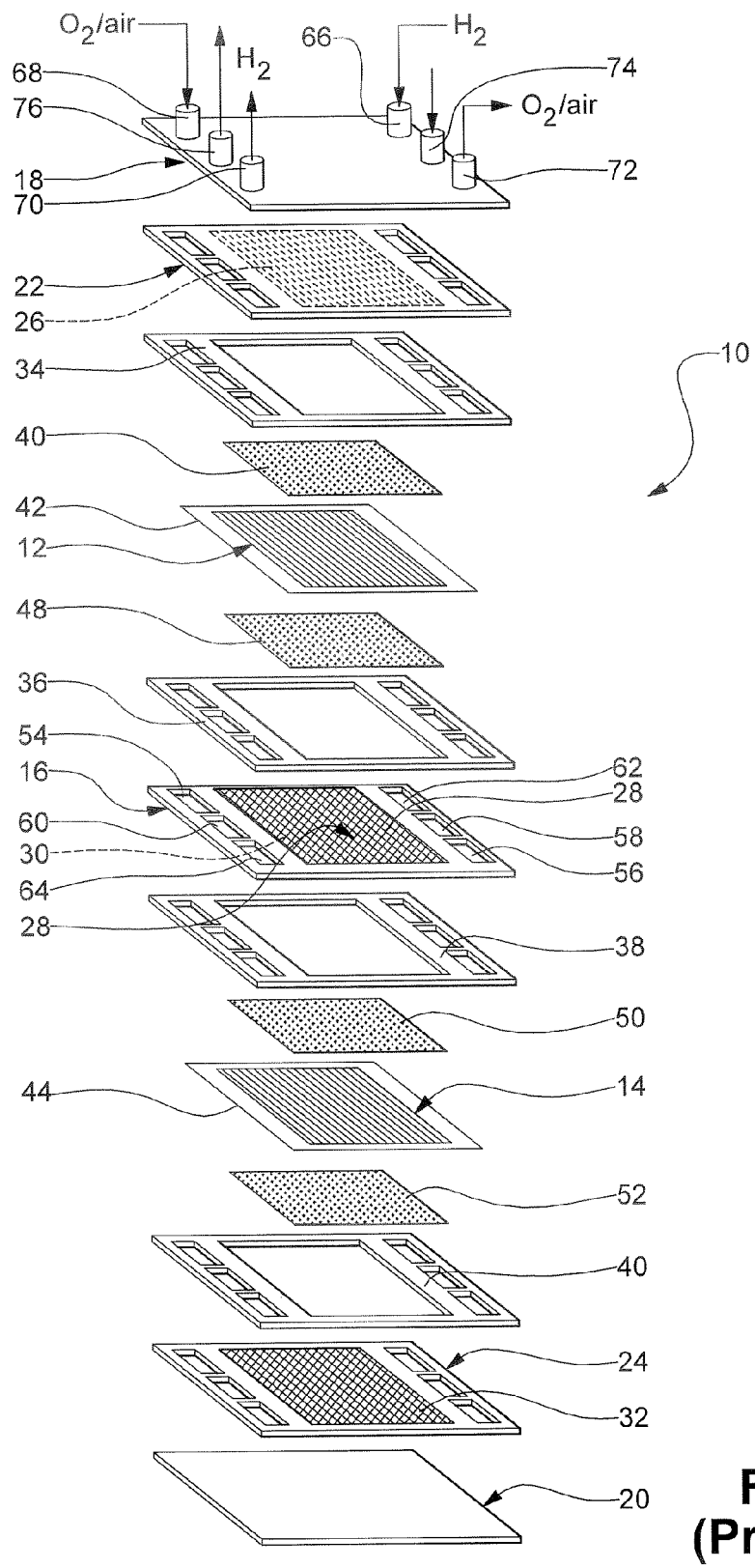
FIG. 1 is an exploded perspective view of a illustrative fuel cell stack known in the art.

FIG. 1 shows an illustrative two-cell bipolar PEM fuel cell stack 10 known in the art. For simplicity, only a two-cell stack (i.e. one bipolar plate) is illustrated in FIG. 1, it being understood that a typical stack will have many more such cells and bipolar plates (for example, as further shown in FIG. 3). Although a bipolar PEM fuel cell stack is shown, it is understood that other fuel cell types and configurations may also be used without departing from the scope and spirit of the disclosure.

The illustrative fuel cell stack 10 includes a first MEA 12 and a second MEA 14, each having an electrolyte membrane disposed between an anode electrode and a cathode electrode. An electrically conductive bipolar plate 16 is disposed between the first MEA 12 and the second MEA 14. The first MEA 12, the second MEA 14, and the bipolar plate 16 are stacked together between clamping plates 18, 20 and end plates 22, 24. The clamping plates 18, 20 are electrically insulated from the end plates 22, 24.

A working face of each of the end plates 22, 24, as well as both working faces of the bipolar plate 16 include a respective flowfield 26, 32, 28, 30 formed therein having a plurality of flow channels. The flowfields 26, 28, 30, 32 distribute reactants such as hydrogen and oxygen/air over the faces of the MEAs 12, 14.

Nonconductive gaskets 34, 36, 38, 40 may be respectively disposed between the end plate 22 and the first MEA 12, the first MEA 12 and the bipolar plate 16, the bipolar plate 16 and the second MEA 14, and the second MEA 14 and the end plate 24. The gaskets 34, 36, 38, 40 facilitate a seal and electrically insulate the end plate 22 and the first MEA 12, the first MEA 12 and the bipolar plate 16, the bipolar plate 16 and the second MEA 14, and the second MEA 14 and the end plate 24.

The MEAs 12, 14 of the illustrative fuel cell stack 10 may have nonconductive subgaskets or barrier films 42, 44. The subgaskets 42, 44, either alone or employed in conjunction with the gaskets 34, 36, 38, 40, extend from the edges of the electrodes and facilitate a seal of the first MEA 12 and the bipolar plate 16 and the bipolar plate 16 and the second MEA 14. The subgaskets 42, 44 also electrically insulate the first MEA 12 and the bipolar plate 16, and the bipolar plate 16 and the second MEA 14. As a nonlimiting example, the subgaskets 42, 44 may be formed respectively integral with the nonconductive gaskets 34, 36, 38, 40. The subgaskets 42, 44 may also be formed integrally with the electrolyte membrane. In other embodiments, the subgaskets 42, 44 are formed from another suitable, electrically nonconductive material and coupled to the MEAs 12, 14, respectively. Collectively, the MEAs 12, 14, the gaskets 34, 36, 38, 40, and the subgaskets 42, 44 are known as fuel cell "softgoods" or "softgood layers".

Gas-permeable DM 46, 48, 50, 52 abut respective electrodes of the first MEA 12 and the second MEA 14. The DM 46, 48, 50, 52 are respectively disposed between the end plate 22 and the first MEA 12, the first MEA 12 and the bipolar plate 16, the bipolar plate 16 and the second MEA 14, and the second MEA 14 and the end plate 24.

The bipolar plate 12, end plates 22, 24, and the gaskets 34, 36, 38, 40 each include a cathode supply aperture 54 and a cathode exhaust aperture 56, a coolant supply aperture 58 and a coolant exhaust aperture 60, and an anode supply aperture 62 and an anode exhaust aperture 64. Supply manifolds and exhaust manifolds of the fuel cell stack 10 are formed by an alignment of the respective apertures 54, 56, 58, 60, 62, 64 in the bipolar plate 12, end plates 22, 24, and the gaskets 34, 36, 38, 40. The hydrogen gas is supplied to an anode supply manifold via an anode inlet conduit 66. The air is supplied to a cathode supply manifold of the fuel cell stack 10 via a cathode inlet conduit 68. An anode outlet conduit 70 and a cathode outlet conduit 72 are also provided for an anode exhaust manifold and a cathode exhaust manifold, respectively. A coolant inlet conduit 74 is provided for supplying liquid coolant to a coolant supply manifold. A coolant outlet conduit 76 is provided for removing coolant from a coolant exhaust manifold. It should be understood that the configurations of the various inlets 66, 68, 74 and outlets 70, 72, 76 in FIG. 1 are for the purpose of illustration, and other configurations may be chosen as desired.

Figure 2:
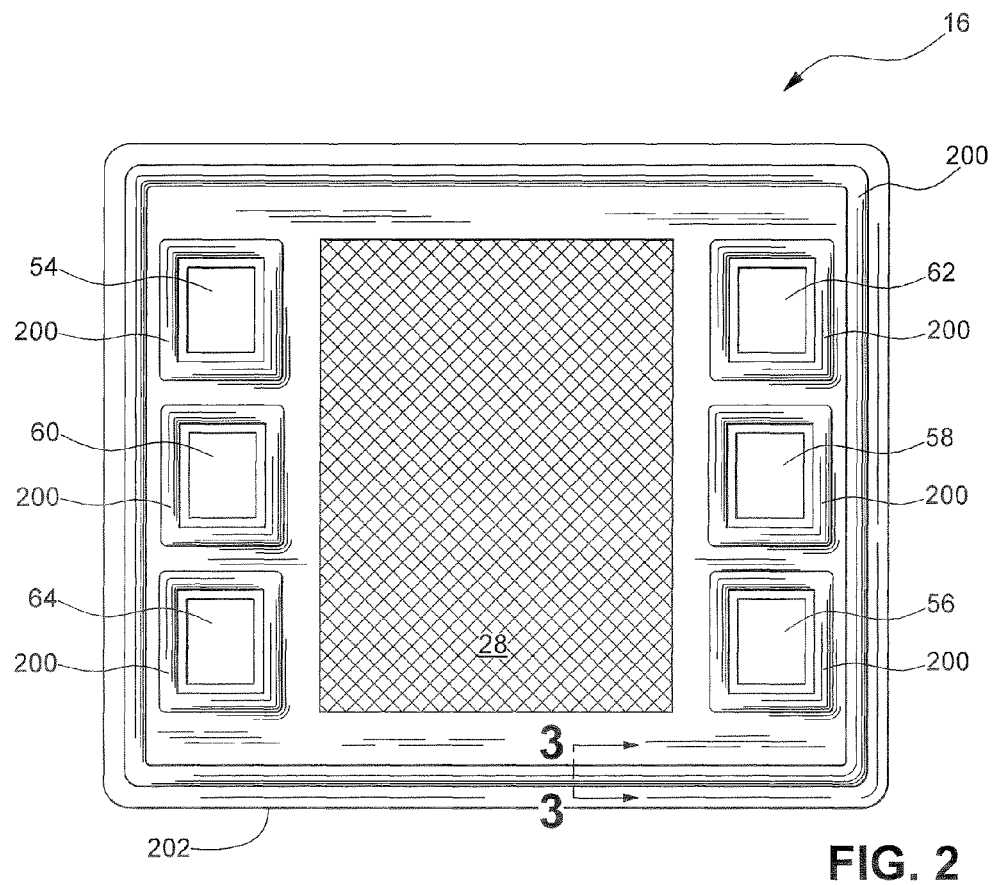
FIG. 2 is a top plan view of a bipolar plate of the fuel cell stack shown in FIG. 1, the bipolar plate having a single bead seal.

FIG. 2 shows the bipolar plate 16 in further detail. The bipolar plate 16 includes a single bead seal 200 formed thereon. The single bead seal 200 is typically formed on the bipolar plate 16 adjacent an outer edge 202 thereof. The single bead seal 200 may be disposed adjacent and surround at least one of the apertures 54, 56, 58, 60, 62, 64.

Figure 3:
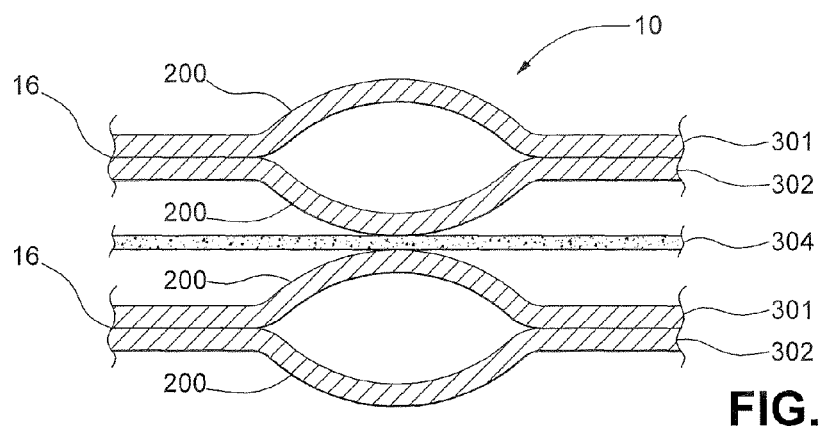
FIG. 3 is a side, cross-sectional view of single bead seals on two bipolar plates assembled in a fuel cell stack known in the art.

Referring now to FIG. 3, a cross-sectional view of the fuel cell stack 10 of the art now having a pair of bipolar plates 16 taken along section line 3-3 in FIG. 2 is shown. It should be appreciated that the fuel cell stack 10 corresponds substantially in structure to the fuel cell stack 10, and that the pair of bipolar plates 16 correspond substantially in structure to the bipolar plate 16, as described hereinabove. The pair of bipolar plates 16 cooperate in a compressed state, for example, having a load applied thereto in a direction substantially normal to a surface of the bipolar plates 16.

Each of the pair of bipolar plates 16 is formed from a first unipolar plate 301 and a second unipolar plate 302. The first unipolar plate 301 is bonded to the second unipolar plate 302. The bonded first and second unipolar plates 301, 302 form internal channels (not shown) adjacent the flowfield 28, 30 of each of the pair of bipolar plates 16 for coolant to flow therethrough for temperature regulation of the illustrative fuel cell stack 10. The first and second unipolar plates 301, 302 may be bonded by at least one of a variety of suitable means known in the art, such as by welding or by an application of an adhesive, for example. Other suitable means for bonding the first unipolar plate 301 with the second unipolar plate 302 may be selected as desired.

The pair of bipolar plates 16 of the fuel cell stack 10 have a softgood layer 304 such as at least one of the gaskets 34, 36, 38, 40 and the subgaskets 42, 44, for example, disposed therebetween. The single bead seal 200 is formed on each of the pair of bipolar plates 16. The single bead seal 200 has a substantially arcuate surface. As a nonlimiting example, the single bead seal 200 may be formed by a stamping operation performed on the first and second plates 301, 302. The single bead seals 200 of each of the pair of bipolar plates 16 sandwich the softgood layer 304 when the fuel cell stack 10 is placed in the compressed state. In the compressed state, contact between the single bead seals 200 results. A substantially fluid-tight seal of the fuel cell stack 10 may thereby be provided.

Figure 4A:
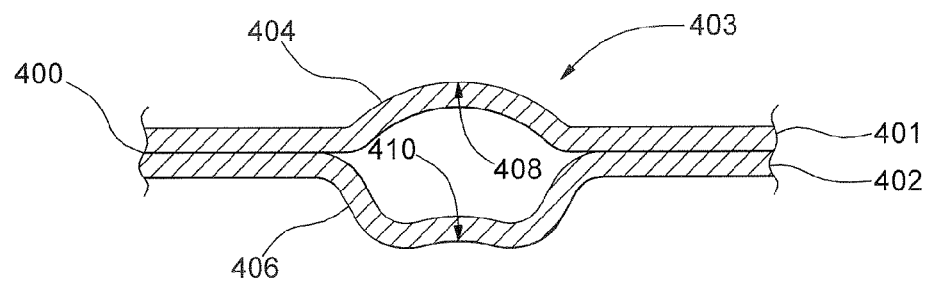
FIG. 4a is a side cross-sectional view of a bipolar plate according to an embodiment of the present disclosure having an interlockable bead seal.

The invention of the present disclosure is described in further detail herein below in relation to FIGS. 4a to 8. With reference to FIG. 4a, an interlockable bipolar plate 400 includes a first plate 401 and a second plate 402. The first and second plates 401, 402 form an interlockable bead seal 403 when bonded together. It should be appreciated that, with the exception of the interlockable bead seal 403, the first and second plates 401, 402 may correspond substantially in structure to the first and second unipolar plates 301, 302 described hereinabove.

The interlockable bead seal 403 includes a first elongate bead 404 formed on the first plate 401 and a second elongate bead 406 formed on the second plate 402. The first elongate bead 404 has a sealing surface 408. The second elongate bead 406 has a trough 410 adapted to receive the sealing surface 408 of the first elongate bead 404. The second elongate bead 406 with the trough 410 is also known as a "double seal bead". The second elongate bead 406 may include a plurality of troughs 410, if desired. As a nonlimiting example, at least one of the sealing surface 408 and the trough 410 may have a cross-sectional shape that facilitates a desired stiffness and resiliency of the interlockable bead seal 403. For example, at least one of the sealing surface 408 and the trough 410 may have a substantially arcuate cross-section. At least one of the first elongate bead 404 and the second elongate bead 406 may be substantially symmetrical about a longitudinal axis thereof. It should be appreciated that at least one of other suitable cross-sectional shapes, e.g. triangular and asymmetrical, may be employed as desired. At least a portion of the sealing surface 408 is adapted to be received in or otherwise interlock with the trough 410 of an adjacent first interlockable bipolar plate 400, for example.

Figure 4B:
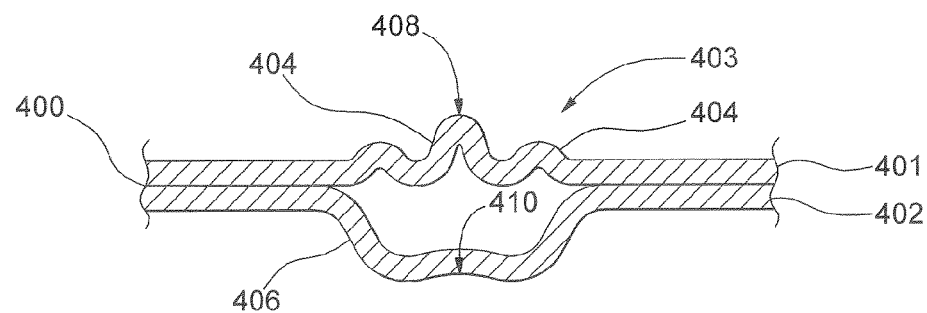
FIG. 4b is a side cross-sectional view of a bipolar plate according to another embodiment of the present disclosure having an interlockable bead seal.

In an alternative embodiment shown in FIG. 4b, the first elongate bead 404 may have a substantially serpentine cross-section. It should be appreciated that the serpentine first elongate bead 404 may be stretched, for example, by a stamping process or the like. The resulting serpentine first elongate bead 404 may thereby be work hardened and have a greater yield stress than observed with the first elongate bead 404 having the substantially arcuate cross-section, for example. A skilled artisan should also appreciate that the interlockable bead seal 403 with at least one of the serpentine first elongate bead 404 and the second elongate bead 404 having a plurality of troughs 410 may provide a greater elastic response than the interlockable bead seal 403 with the first elongate bead 404 having the single arcuate cross-section and the second elongate bead 406 having the single trough 410. Other cross-sectional shapes of the first and second elongate beads 404, 406 that provide the interlockable bead seal 403 with the desired elastic response may be employed as desired.

It should be appreciated that, other than the interlockable bead seal 403, the interlockable bipolar plate 400 may correspond substantially in structure to the bipolar plate 16 described hereinabove. The interlockable bead seal 403 may be disposed adjacent a peripheral edge of the interlockable bipolar plate 400. Likewise, the interlockable bead seal 403 may be disposed around at least one of the apertures 54, 56, 58, 60, 62, 64 formed in the interlockable bipolar plate 400. Other suitable locations for the interlockable bead seal 403 may be selected as desired.

In illustrative embodiments shown in FIGS. 5 to 8, a fuel cell stack 500 may be formed by a plurality of interlockable bipolar plates 400 aligned in a stack. Like or related structure from FIGS. 4a and 4b have the same reference numerals with a prime (') symbol or a double-prime (") symbol for purpose of clarity.

In FIG. 5, the plurality of interlockable bipolar plates 400 includes a first interlockable bipolar plate 400' formed from the first and second plates 401', 402', and a second interlockable bipolar plate 400" formed from the first and second plates 401", 402". The first and second interlockable bipolar plates 400', 400" have corresponding first and second interlockable bead seals 403', 403", each with first elongate beads 404', 404" and second elongate beads 406', 406", respectively. The first elongate beads 404', 404" have corresponding sealing surfaces 408', 408" and the second elongate beads 406', 406" have corresponding troughs 410', 410". The trough 410' of the first interlockable bipolar plate 400' is adapted to receive the sealing surface 408" of the second interlockable bipolar plate 400". It should be appreciated that the first and second interlockable bead seals 403', 403" may thereby facilitate a desired alignment of the plurality of bipolar plates 400 in the fuel cell stack 500.

The first and second interlockable bipolar plates 400', 400" of the fuel cell stack 500 have a softgood layer 502, for example, at least one of the gaskets 34, 36, 38, 40 and the subgaskets 42, 44, disposed therebetween. It should be appreciated that, unless otherwise noted, the softgood layer 502 may correspond substantially in structure to the illustrative softgood layer 304 of the art described hereinabove. In FIG. 5, the fuel cell stack 500 is shown in an uncompressed state, i.e., the fuel cell stack 500 not having a load applied thereto in a direction substantially normal to a surface of the first and second interlockable bipolar plates 400', 400" sufficient to cause the interlockable bipolar plates 400', 400" to contact.

Referring now to FIG. 6, the fuel cell stack 500 is shown in the compressed state with the sealing surface 408" of second interlockable bead seal 400" forming a contact surface 600 with the trough 410' of the first interlockable bead seal 400'. An interlocking bead seal 602 is thereby formed that provides a substantially fluid-tight seal between the first and second interlockable bipolar plates 400', 400". When correctly aligned, a longitudinal center line of the sealing surface 408" may contact the trough 410' and deform to match a contour of the trough as the fuel cell stack 500 is compressed.

It should be appreciated that the interlockable bead seals 403', 403" may be resilient, for example, and have a substantially elastic response to a load. The substantially elastic response militates against concentrated contact pressures by increasing a contact area of the contact surface 600 and providing a more uniform distribution of the contact pressure with the load. The sealing surfaces 408', 408" of the first elongate beads 404', 404" may have an elastic response sufficient for the first elongate beads 404', 404" to cyclically and elastically deform into the second elongate bead 404 and recover during a typical expansion and contraction of the fuel cell stack 500 during an operation thereof. The elastic response also militates against a degradation of the sealing surfaces 408', 408" during operation of the fuel cell stack 500.

The resilient nature of the interlockable bead seals 403', 403" of the present disclosure optimizes a disassembly and rebuilding of the fuel cell stack 500. For example, the bipolar plates 400', 400" may be reused since a plastic deformation of the interlockable bead seals 403', 403" is minimized. The fuel cell stack 500 can be disassembled; components of the fuel cell stack 500, such as the MEAs 12, 14 can be replaced; and the fuel cell stack 500 can then be reassembled with the original bipolar plates 400', 400". The resilient nature of the interlockable bead seals 403', 403" allows the interlocking bead seal 602 to be reestablished while substantially maintaining the original fuel cell stack 500 height, for example.

As nonlimiting examples, at least one of the first and second elongate beads 404, 406 of the interlockable bead seal 403 may have an elastic response up to about 100 microns, in particular embodiments up to about 150 microns, and in particularly illustrative embodiments up to about 200 microns. The interlockable bead seal 403 may also plastically deform with load to a desired extent and have a desired elastic response range as described herein, for example. A skilled artisan should appreciate that suitable elastic recovery values for the interlockable bead seal 403 may be selected as desired, based at least in part on the particular fuel cell stack 500 design employed.

The softgood layer 502 of the fuel cell stack 500 in the compressed state cooperates with the first and second interlockable bead seals 403', 403" to facilitate a substantially fluid tight seal therebetween. As shown in FIG. 7, the softgood layer may have a micro-seal 700 formed thereon. The micro-seal 700 is adapted to facilitate the substantially fluid tight seal. In another embodiment shown in FIG. 8, the micro-seal 700' may be formed on at least one of the sealing surfaces 408', 408" and the troughs 410', 410" of the interlockable bipolar plates 400', 400". The micro-seal can be any conventional material, such as an elastomer, for example, or other material that provides the desired sealing properties. The micro-seal 700, 700' may be formed by at least one of screen-printing, dispensing, and molding, for example. It should be appreciated that other means for forming the micro-seal 700, 700' may be employed as desired.

A skilled artisan should further understand that, although the interlockable bead seals 403 described herein have only one sealing surface 408 and one trough 410, the scope of the present disclosure includes interlockable bead seals 403 having a plurality of the sealing surfaces 408 and a plurality of troughs 410 for receiving the plurality of the sealing surfaces 408.

It is surprisingly found that the interlockable bead seals 403 of the present disclosure militate against a lateral movement or slippage between the first and second interlockable bipolar plates 400', 400" during an operation of the fuel cell stack 500. Lateral movement is also limited during a collision or vibrational event during an operation of a vehicle having the fuel cell stack 500. A tenting effect on the softgoods that may occur with lateral movement is thereby militated against. Slippage between the first and second interlockable bipolar plates 400', 400" and the diffusion media, and the resulting degradation of the diffusion media that would normally result therefrom, are also militated against with the present invention. The interlockable bead seals 403 also facilitate formation of a greater contact area than provided with other seals.

A softgood layer 502 or the interlockable bipolar plate 400 having the interlockable bead seal 403 of the disclosure can be manufactured at a reduced cost compared to a softgood layer or fuel cell stack employing a typical prior art bead seal. The interlockable bead seal 403, for example, does not require additional surface finish treatment such as a application of a sealant material, for example. The cost of manufacturing is thereby minimized by incorporating the interlockable bead seal 403 directly into the interlockable bipolar plate 400, for example, by stamping, and eliminating manufacturing involving the application of the sealant.

Moreover, interlockable bipolar plates 400 of the present invention may facilitate the production of the fuel cell stack 500 without the non-conductive gaskets 34, 36, 38, 40 described hereinabove in FIG. 1. The materials and assembly costs of the fuel cell stack 500 are thereby further optimized.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell stack, comprising:
a plurality of bipolar plates aligned in a stack, each of the bipolar plates including a first interlockable bead seal with a trough and a second interlockable bead seal with a sealing surface, wherein the sealing surface of the second interlockable bead seal of one of the bipolar plates is received in and interlocks with the trough of the first interlockable bead seal of another of the bipolar plates and the first interlockable bead seal the second interlockable bead seal are not coextensive with a reactant flow field disposed between the bipolar plates.

2. The fuel cell stack according to claim 1, wherein the sealing surface and the trough facilitate an alignment of the bipolar plates.

3. The fuel cell stack according to claim 1, wherein the sealing surface and the trough form a substantially fluid-tight seal.

4. The fuel cell stack according to claim 1, further comprising a softgood layer disposed between the first interlockable bead seal and the second interlockable bead seal.

5. The fuel cell stack according to claim 4, wherein the softgood layer includes a micro-seal formed thereon.

6. The fuel cell stack according to claim 4, wherein the softgood layer cooperates with the first and second interlockable bead seals to facilitate a substantially fluid tight seal therebetween.

7. The fuel cell stack according to claim 1, wherein a compressive force applied to the stack causes an elastic deformation of the first elongate bead and the second elongate bead.

8. The fuel cell stack according to claim 1, wherein the first and second interlockable bead seals militate against a lateral slippage between the bipolar plates.

9. The fuel cell stack according to claim 1, wherein the first interlockable bead seal has an elastic recovery that militates against a degradation of the sealing surface during an operation of the fuel cell stack.

10. The fuel cell stack according to claim 1, further comprising a micro-seal disposed between the sealing surface and the trough.

11. The fuel cell stack according to claim 10, wherein the micro-seal is formed on one of the sealing surface and the trough.

12. The fuel cell stack according to claim 1, wherein the first interlockable bead seal and the second interlockable bead seal are adjacent an outer edge of the bipolar plate.

13. The fuel cell stack according to claim 1, wherein the first interlockable bead seal and the second interlockable bead seal are disposed adjacent to and surround an aperature in the bipolar plate.

14. The fuel cell stack according to claim 1, wherein each of the bipolar plates is formed from a first unipolar plate and a second unipolar plate.

15. A fuel cell stack, comprising:
a first bipolar plate including a first interlockable bead seal with a trough and a second interlockable bead seal with a sealing surface;
a second bipolar plate including a first interlockable bead seal with a trough and a second interlockable bead seal with a sealing surface, wherein the first bipolar plate and the second bipolar plate are aligned in a stack and the sealing surface of the second interlockable bead seal of the first bipolar plate is received in and interlocks with the trough of the first interlockable bead seal of the second bipolar plate to form an interlocked bead seal; and a reactant flow field disposed between the first bipolar plate and the second bipolar plate, wherein the reactant flow field does not overlap the interlocked bead seal.

16. The fuel cell stack according to claim 15, wherein the interlocked bead seal is adjacent an outer edge of the first bipolar plate and an outer edge of the second bipolar plate.

17. The fuel cell stack according to claim 15, wherein the interlocked bead seal surrounds an aperture in the first bipolar plate and an aperture in the second bipolar plate.

18. A fuel cell stack, comprising:
a first plate including a first interlockable bead seal with a trough;
a second plate including a second interlockable bead seal with a sealing surface;
a reactant flow field disposed between the first plate and the second plate; and
an interlocked bead seal formed by the sealing surface of the second interlockable bead seal being received in and interlocking with the trough of the first interlockable bead seal, wherein the interlocked bead seal and the reactant flow field are not coextensive.

19. The fuel cell stack according to claim 18, wherein the interlocked bead seal is adjacent a peripheral edge of the first plate, a peripheral edge of the second plate, or a peripheral edge of the first plate and a peripheral edge of the second plate.

20. The fuel cell stack according to claim 18, wherein the interlocked bead seal surrounds an aperature in the first plate, an aperature in the second plate, or an aperature in the first plate and an aperature in the second plate.

* * * * *